United States Patent [19]

Polaczy et al.

[11] Patent Number: 4,759,710
[45] Date of Patent: Jul. 26, 1988

[54] APPARATUS FOR MELTING A SOLDER BY VAPOR-PHASE TREATMENT

[75] Inventors: Andreas Polaczy, Hanau; Werner Simon, Westerngrund, both of Fed. Rep. of Germany

[73] Assignee: W. C. Heraeus GmbH, Hanau, Fed. Rep. of Germany

[21] Appl. No.: 23,682

[22] Filed: Mar. 9, 1987

[30] Foreign Application Priority Data

Jun. 13, 1986 [DE] Fed. Rep. of Germany ....... 3619964

[51] Int. Cl.$^4$ .................... F27D 19/00; F26B 19/00
[52] U.S. Cl. ......................... 432/42; 432/59; 432/179; 432/197; 432/210; 432/32; 34/78; 219/271; 219/275
[58] Field of Search .............. 432/59, 8, 32, 18, 10–12, 432/27, 77, 161, 84, 42, 48, 233, 210, 197, 173; 34/78; 219/271, 275

[56] References Cited

U.S. PATENT DOCUMENTS

| | | | |
|---|---|---|---|
| 1,236,719 | 8/1917 | Kniffen | 34/78 |
| 2,435,318 | 2/1948 | McFeaters | 432/173 |
| 2,958,520 | 11/1960 | Fritz | 432/210 |
| 3,947,240 | 3/1976 | Pfahl, Jr. | 432/210 |
| 4,238,122 | 12/1980 | Snyder et al. | 34/78 |
| 4,348,174 | 9/1982 | Spigarelli | 432/210 |
| 4,389,797 | 6/1983 | Spigarelli et al. | 34/78 |
| 4,612,712 | 9/1986 | Pescatore et al. | 34/78 |
| 4,628,616 | 12/1986 | Shiari et al. | 432/197 |
| 4,629,420 | 12/1986 | Waldron | 432/59 |
| 4,634,000 | 1/1987 | Plapp et al. | 34/78 |
| 4,658,513 | 4/1987 | Strattman | 34/78 |

Primary Examiner—Henry C. Yuen
Attorney, Agent, or Firm—Felfe & Lynch

[57] ABSTRACT

Apparatus for melting by vapor-phase treatment a solder applied to an object. The liquid serving for vapor production, which is situated in a vessel, is heated by electrical heating means which are disposed exclusively outside of the vessel and are completely enveloped by a liquid heat-carrying medium. The vessel floor is provided with projections to increase the thermal transfer. A tubing coil is furthermore disposed in the heat-carrying medium for rapid cooling thereof.

3 Claims, 1 Drawing Sheet

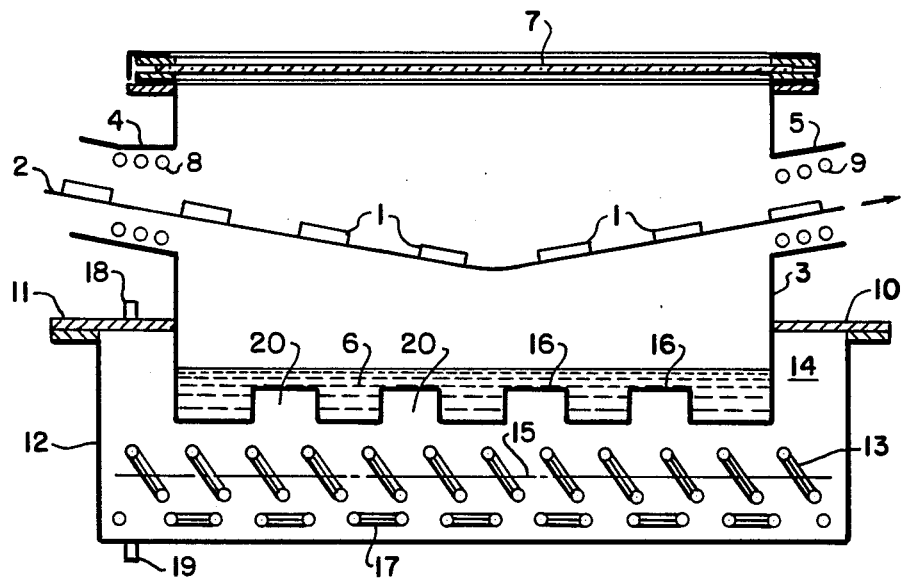

APPARATUS FOR MELTING A SOLDER BY VAPOR-PHASE TREATMENT

BACKGROUND OF THE INVENTION

The invention relates to an apparatus for melting by vapor-phase treatment a solder that has been applied to an object.

An apparatus for melting by vapor-phase treatment a solder that has been applied to an object is disclosed in the German Patent No. 2,442,180. This apparatus has a vessel which contains a heat-transfer liquid. The vessel is provided with entry and exit ports through which the object that is to be treated can enter and leave, respectively. The heat-transfer liquid is heated at least to ebullition by electrical heating means disposed in this liquid. External heat sources, such as a hot-plate for example, can additionally be used. In the vessel there is produced a saturated vapor of the heat-transfer liquid which condenses in contact with the solder and the object that are to be treated. By the transfer of the latent heat of evaporation from the condensed vapor to the object, the solder is heated so that it melts on the object.

In such apparatus a liquid fluorocarbon is preferably used as the heat-transfer liquid. Heated vapor, which can reach the atmosphere through the entry and exit ports, is hazardous to health, so that the allowable amount of such vapor emission is increasingly limited by government regulations as well as by safety standards, in order to protect personnel operating or working near the apparatus. Such hazards, however, cannot be eliminated from the known apparatus because burn-through and resultant excessive overheating of the heat-transfer liquid cannot be completely prevented. Also, the incrustation of the heating elements disposed in the heat-transfer liquid cannot be completely prevented in the known apparatus.

The principal objectives of the invention are therefore to create an electrical heating system for apparatus for melting, by vapor-phase treatment, the solder applied to an object, which (1) will prevent the formation of toxic vapors from the heat-transfer liquid, (2) will permit a good input of heat to this liquid, and (3) will be easy to clean.

SUMMARY OF THE INVENTION

These as well as other objectives are achieved, according to the present invention, by disposing the electrical elements exclusively outside of the vessel and by enveloping them completely in a liquid heat-carrying medium which directly bathes the outside wall of the vessel in the region of the vessel bottom.

It has been found especially effective to dispose the electrical heating means, in the form of a heating coil, beneath the vessel bottom, with the axis of this heating coil substantially horizontal. For better thermal transfer, the vessel bottom advantageously has raised portions protruding into the interior of the vessel, thereby considerably increasing the thermal transfer area. At the same time these projections desirably form chambers which are filled with heat-transfer medium. An especially advantageous embodiment consists in folding the bottom of the vessel in accordion fashion as seen in vertical cross section.

The indirect heating of the heat-transfer liquid according to the invention assures that no local overheating of this liquid can occur, thereby considerably reducing the danger of the formation of health-threatening vapors and their escape from the apparatus. Furthermore configuring the heating system according to the invention permits easy cleaning of the heating elements. For this purpose all that is required is to drain the liquid heat-transfer medium out of the tub containing the heating means and to remove this tub from its holding means. The electrical heating elements are then freely accessible and can be easily cleaned.

For a full understanding of the present invention, reference should now be made to the following detailed description of the preferred embodiment of the invention and to the accompanying drawing.

BRIEF DESCRIPTION OF THE DRAWING

The single FIGURE is a diagrammatic vertical section through an apparatus for melting by vapor-phase treatment the solder applied to an object.

DESCRIPTION OF A PREFERRED EMBODIMENT

As seen in the FIGURE, the objects 1 that are to be treated are carried by a conveyor belt 2 into the vessel 3 through an entry port 4, and out of it through an exit port 5 after the vapor phase treatment. The vessel 3 contains the heat transfer liquid 6. It is closed by a cover 7, preferably of transparent material. Both the entry port 4 and the exit port 5 advantageously have a cooling coil 8 and 9, respectively. To the support means 10 and 11 which are attached to the vessel, and which may be in the form of a flange, for example, there is fastened a tub 12 in which a heating coil 13 is disposed in a liquid heat carrying medium 14, preferably an oil bath. As illustrated, the axis 15, indicated by a broken line, is substantially horizontal. The heating coil 13 is disposed underneath the bottom of the vessel 3. The vessel bottom is provided with projections 16, so that the vessel bottom is made up of accordion-like folds. The projections 16 form chambers 20 which are also filled with heat carrying medium. In addition to the heating coil 13, a coiled tube 17 through which a cooling liquid can flow is also disposed in the tub 12. An inlet 18 is provided in the support means for the entry of the liquid heat carrying medium 14 into the tub 12. When it is necessary to clean the heating coil 13, the liquid heat carrying medium 14 is drained out through an outlet 19 and the tub 12 is released from the support means 10 and 11, so that the heating coil 13 is then freely accessible for cleaning.

The apparatus constructed in accordance with the invention operates as follows: By means of the electrical heating coil 13 the liquid heat carrying medium 14 is heated to such a temperature that the liquid 6 is heated at least to ebullition. The vapors forming from the liquid 6 condense on the objects 1 that are to be treated. The heat released by condensation heats the solder applied to the objects 1 to the melting temperature. Due to the design of the heating system according to the invention, a uniform heating of the heat-transfer liquid is reliably assured. Furthermore, the tubing coil 17 provided in the tub 12 makes it possible in case of emergency to cool down the heat-transfer liquid 6 in a very short time by passing a cooling liquid, such as water for example, through the tubing coil 17.

There has thus been shown and described a novel apparatus for melting a solder by vapor-phase treatment which fulfills all the objects and advantages sought therefor. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention which is limited only by the claims which follow.

What is claimed is:

1. An apparatus for melting by vapor-phase treatment a solder applied to an object, comprising (1) a vessel connected with the atmosphere having an inlet and an outlet through which the object is introduced into, and removed from the vessel, respectively, and in which vessel the object is subjected to the vapor-phase treatment, (2) a heat-transfer liquid, contained in said vessel, whose boiling point is at least equal to the melting point of the solder, (3) electrical means for heating said heat-transfer liquid, and (4) cooling coils arranged adjacent said inlet and outlet which lessen the escape into the atmosphere of vapors formed from the heat-transfer liquid, the improvement wherein said electrical heating means includes heating elements disposed exclusively outside of said vessel, said heating elements being completely enveloped by a liquid heat carrying medium which directly bathes the outer wall of said vessel in the region of the vessel bottom; wherein the bottom of said vessel is folded in accordion fashion in verticle section to form a plurality of projections protruding into the interior of said vessel; and wherein the apparatus further comprises tube coils, through which cooling liquid can flow, disposed in said heating carrying medium for the rapid cooling thereof.

2. The apparatus according to claim 1, wherein said heating elements include at least one heating coil having a substantially horizontal axis, disposed beneath said vessel bottom.

3. The apparatus according to claim 1, wherein said projections form chambers which are filled with heat carrying medium.

* * * * *